May 19, 1970 G. S. GREENFIELD 3,512,630
LIVE STORAGE
Filed Feb. 19, 1968 2 Sheets-Sheet 1
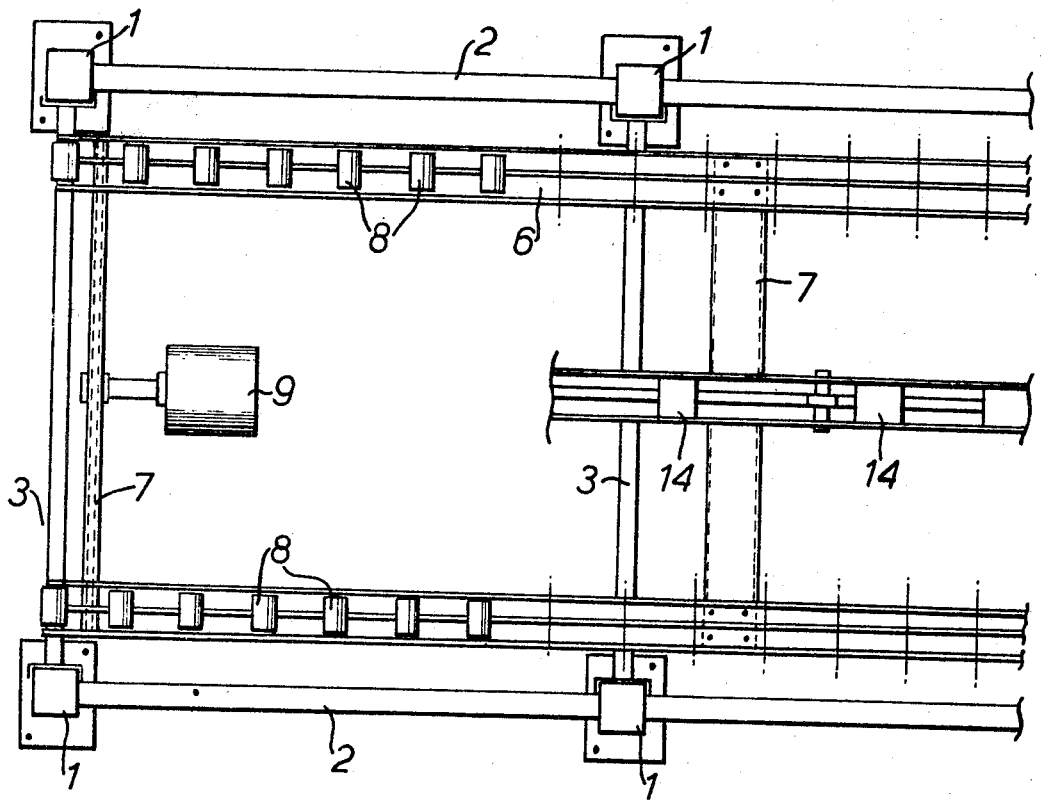
Fig. 1.
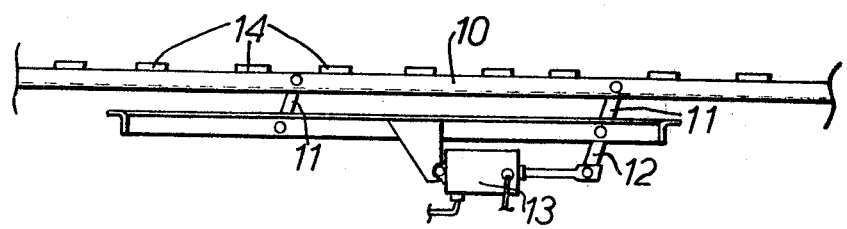
Fig. 2.
Fig. 3.

May 19, 1970  G. S. GREENFIELD  3,512,630
LIVE STORAGE
Filed Feb. 19, 1968  2 Sheets-Sheet 2
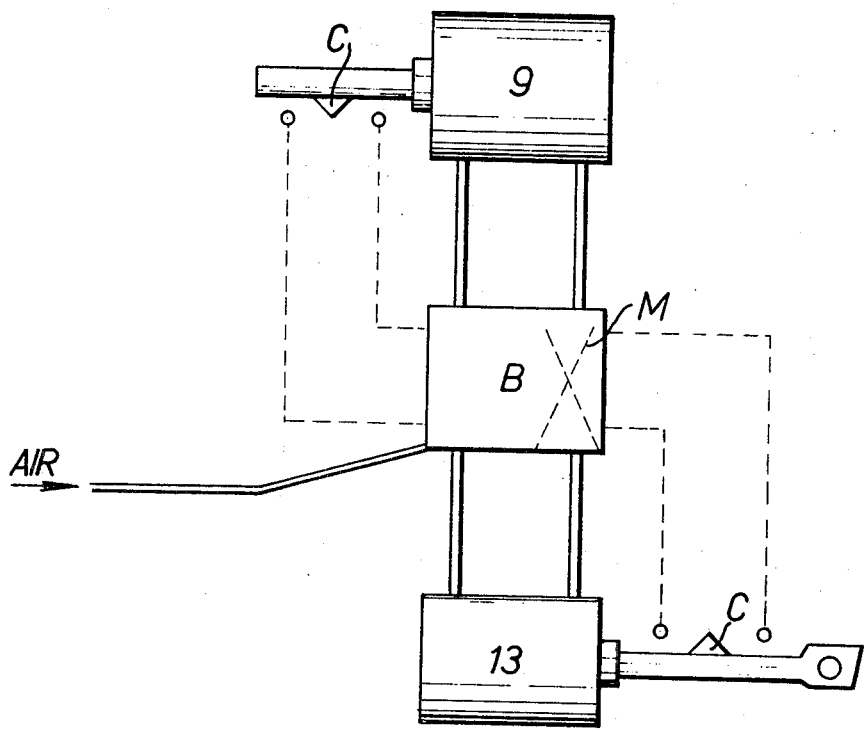

United States Patent Office 3,512,630
Patented May 19, 1970

3,512,630
LIVE STORAGE
Gordon S. Greenfield, Sutton Coldfield, England, assignor to Steel Equipment Company Limited, a British company
Filed Feb. 19, 1968, Ser. No. 706,450
Claims priority, application Great Britain, Feb. 17, 1967, 7,665/67
Int. Cl. B65g 25/04
U.S. Cl. 198—225                    8 Claims

ABSTRACT OF THE DISCLOSURE

In a live storage system, in which a track carrying freely rotatable load-supporting rollers is reciprocated horizontally to move the load, clamping means are arranged to be moved positively into and out of engagement with the load under power, for example by pneumatic rams, in synchronism with the reciprocation in such a manner that the clamping means restrain the load as the track is moving one way and free it to move with the track as the track is moving the other way. Preferably the clamping means engage frictionally against a surface of the load that extends parallel to the direction of travel, for example the bottom surface of the load.

---

This invention relates to storage racks of the kind known as live storage racks or marshalling conveyors on which articles, or pallets carrying articles, are normally stored, but along which they can be moved intermittently, normally in a direction from an input end or loading station to a discharge end or unloading station.

It has been proposed to construct such racks in the form of a framework supporting a track of freely rotatable rollers which is slightly inclined downhill towards the unloading end and is capable of being reciprocated in the direction of its length, so that the goods supported on the rollers are progressively urged towards the unloading end. Such an arrangement can be quite satisfactory where the goods are uniform and have flat clean undersides in contact with the rollers, but where the goods are liable to vary in their frictional qualities some may move more easily than others and so the goods can tend to bunch up. Where the goods move too easily and where there are only one or two articles on the rack, close up to the unloading end, the addition of a further article at the loading end can lead to that article running with undue speed down the length of the track and hitting those at the unloading end with a substantial impact.

It has also been proposed to construct conveyors, as opposed to live storage racks, in the form of a horizontally reciprocating rack carrying rollers incorporating one-way clutches, so that the goods are carried with the rack in one direction but slip in the other. In another proposal for a conveyor there is a reciprocating rack carrying freely rotatable rollers, and spring-loaded pawls on the stationary frame project into the path of the goods and permit them to move with the rack in one direction but not to return with the rack in the other. However, such a construction has the disadvantage that the amplitude of the reciprocating travel of the rack must be greater than the length of the individual article and in the case of packing cases or pallets this can be very large. This involves substantial inertia forces and heavy power consumption. Furthermore, it can, like the construction with the rollers having one-way clutches, lead to undesirable impacts between the successive articles.

The aim of the present invention is to provide a live storage rack construction of the kind involving a reciprocating roller-carrying rack, but reliable and smooth in operation even when handling goods of varying qualities.

According to the invention we now propose a live storage structure comprising a framework supporting a substantially horizontal track carrying freely rotatable rollers on transverse axes and means for reciprocating the track in the direction of its length, together with intermittently operating clamping means placed to engage goods resting on the rollers and positively operated in sequence with the reciprocation of the track so as to engage and hold the goods against movement as the track moves in one direction and release the goods to move with the track as the track moves in the other direction.

Preferably the clamping means engage frictionally against a surface, such as a side or bottom surface, that extends in the direction of movement. The engagement will then be equally effective regardless of the relative positions of the goods and the clamping means.

For example, where the track is reciprocated by a fluid-pressure ram, the clamping means may comprise a friction pad which is urged against the goods by a second fluid-pressure ram and the two rams are actuated alternately in synchronism, with the admission of the fluid to one ram being controlled by the other reaching the end of its stroke.

The invention will now be further described by way of example with reference to the accompanying drawings, in which:

FIG. 1 is a plan view of a part of the installation;
FIG. 2 is a transverse section;
FIG. 3 is a side elevation of the clamping means; and
FIG. 4 indicates diagrammatically the system for controlling the movement of the various parts in sequence.

Referring first to FIGS. 1 and 2, posts 1 interconnected by longitudinal members 2 and transverse beams 3 form a framework carrying longitudinal rails 4 of angle section in pairs, supporting between them wheels 5. On these wheels rests a reciprocating track made up of longitudinal channel section members 6 held together by transverse ties 7. The whole structure can be made in sections so that an installation can be built up of any desired length, limited only by the structural strength and the forces involved in reciprocating the track. Rollers 8 mounted in the members 6 at relatively close intervals form a supporting surface for pallets, containers, crates, packing cases or whatever other goods are to be stored.

The track assembly 6, 7, 8 is reciprocated horizontally in the direction of its length by a pneumatic ram, indicated diagrammatically at 9 at the input end of the track, although it could equally well be at the output end. Although a hydraulic ram could be used, the relatively small amplitude of movement involved (about four inches in a typical example) and the low force required allow the use of pneumatic operation, which provides adequate power at much lower cost.

Placed in the middle of the track is the clamping means comprising a bar 10 extending the full length of the track and supported at spaced intervals on links 11 pivoted to the stationary framework. It will be observed that these links are inclined upwards and towards the output end of the track.

One of the links 11 is extended downwards below its pivot at 12 and its lower end is engaged by a pneumatic ram 13. The ram is shown in its retracted position. When it is extended the links 11 come nearer to an upright position and the bar 10 rises slightly. The bar is at such a level that this causes spaced friction pads 14 of rubber or the like on its upper face to engage against the underside of any pallets or other flat-bottomed articles resting on the rollers 8.

The rams 9 and 13 are fed from a common air supply through valves that are automatically actuated, for example through cams C (FIG. 4), by the travel of the track assembly 6, 7, 8 and the movement of the bar 10 so these two movements occur in sequence as follows; when it is desired to move the goods along the track (usually following removal of goods from the output end), air is admitted to a valve block B and the ram 9 performs its stroke to move the track assembly 6, 7, 8 towards the output end. Completion of this stroke causes the admission of air to the ram 13, which lifts the bar 10 and engages the undersides of all the pallets or other goods present on the track. Completion of the latter movement will then cause admission of air to the opposite end of the ram 9 to effect a return stroke of that ram. The track assembly 6, 7, 8 returns to its starting position but the goods are held stationary by the bar 10. Completion of this return stroke then initiates the admission of air to the opposite end of the ram 13, lowering the bar 10 and releasing the goods. The cycle is then repeated, and is carried on indefinitely so long as the air supply to the valve block is maintained.

The control system formed by the valve block B and valve-operating cams C are illustrated in FIG. 4, but only diagrammatically, as their detailed connection will be well understood by those skilled in the art.

The overall control of the admission of air may be by means of a manual valve or it could be initiated automatically by sensing means that detect the absence of goods at the output end or respond to the arrival of goods on the input end of the track.

It will be appreciated that the inclination of the links 11 results in a wedging action during the return stroke of the track in that, the greater the horizontal force of the goods on the pads 14, the harder are the pads pressed against the goods.

The valve block may incorporate switching means M for charging over the sequence of operation of the rams 9 and 13 at will, so that they feed the goods in the opposite direction, i.e. from output to input where this may be required under some circumstances. The wedging action mentioned in the previous paragraph is not obtained during this reverse feeding but under most conditions the movement is sufficiently reliable.

Various modifications are possible. For example there may be more than one ram 9, and there could be more than one ram 13. In fact each link 11 could be operated by a separate ram 13, and the bar 10 joining all the links could be omitted, the pads 14 then being mounted on the individual links. Instead of engaging the underside of the goods the pads 14 could be arranged to engage a side, or both sides simultaneously, or even the top of the goods.

Instead of a pneumatic ram or rams for performing the clamping one could use electromagnetic solenoid-operated means, or even mechanical cams or the like. The essential thing is that these clamping means are positively actuated in sequence with the means that reciprocate the track.

It is important to observe that in each of the possible arrangements mentioned above the clamping means comprising the friction pads engage frictionally against a surface of the goods that extends in the direction of movement. Consequently the engagement is equally effective regardless of the position of the goods along the track and there is no necessity for the articles to be spaced apart by a substantial dintance, as would be required by pawls engaging between the successive articles. All the articles are engaged equally well, regardless of their spacing and number, and are moved an equal distance.

I claim:

1. A live storage structure comprising a supporting framework, a substantially horizontal track movably mounted thereon for reciprocation in opposite directions along the length of said track, first power means for reciprocating said track in said directions, a plurality of freely rotatable load-supporting rollers in said track, clamping means adapted to be moved into and out of engagement with a load supported on said rollers and serving, when in engagement with the load, to oppose relative movement between the load and the framework, second power means actuating said clamping means, and a sequential control system controlling both said first and second power means in sequence such that clamping means are in a position to engage the load as the track moves in one of said directions and to release said load as the track moves in the other direction.

2. The live storage structure set forth in claim 1 wherein said clamping means have a frictional clamping surface extending in a plane parallel to said directions.

3. The live storage structure set forth in claim 2 wherein said clamping means are inclined towards the path of the load in a direction contrary to that direction of movement of the track during which said load is engaged by said clamping means.

4. The live storage structure set forth in claim 3 wherein said clamping means comprise a plurality of frictional clamping surfaces spaced along a bar extending parallel to said directions, and engaged by a single common power means.

5. The live storage structure set forth in claim 1 wherein said first and second power means comprise fluid pressure rams and said control system comprises valve means actuated by said first power means on completion of the stroke of the latter to admit fluid pressure to said second power means.

6. The live storage structure set forth in claim 5 wherein said control comprises further valve means, actuated by said second power means on completion of the stroke of the latter to admit fluid pressure to said first power means.

7. The live storage structure set forth in claim 6 further including switching means allowing reversal of the sequence of operation of said first and second power means.

8. A live storage structure of the kind comprising a track carrying load-supporting rollers and reciprocated in the direction of its length by power means, means being provided for engaging and restraining a load supported on the rollers as the track moves one way but allowing movement of the load with the track as the track moves the opposite way, wherein the improvement comprises the provision of second power means positively actuating said engaging and restraining means and controlled in synchronism with said first-mentioned power means.

References Cited

UNITED STATES PATENTS

| 2,557,170 | 6/1951 | Bjorlo | 198—227 XR |
| 2,820,542 | 1/1958 | Oswald | 198—218 |
| 2,901,096 | 8/1959 | Burrows | 198—225 |

ROBERT G. SHERIDAN, Primary Examiner